May 12, 1959   A. J. J. LAMBEEK   2,886,380
BEARING
Filed Jan. 23, 1957

FIG. I

INVENTOR
ADRIAAN JAN JURRIAAN LAMBEEK

BY
AGENT

United States Patent Office 2,886,380
Patented May 12, 1959

2,886,380
BEARING

Adriaan Jan Jurriaan Lambeek, Dordrecht, Netherlands, assignor, by mesne assignments, to North American Philips Company, Inc., New York, N.Y., a corporation of Delaware Application January 23, 1957, Serial No. 635,778

Claims priority, application Netherlands November 29, 1956

2 Claims. (Cl. 308—72)

It is known to design a bearing comprising a self-adjusting spherical body. The spherical body usually consists of porous self-lubricating material which has an aperture in which a shaft is journalled. The ball is supported by the bearing casing on one side thereof and a dish-shaped member on an opposite side thereof. The casing is provided with a covering plate and between the covering plate and the dish-shaped member a compression spring is present. Moreover, an oil-impregnated felt ring is provided which acts to give lubrication to the ball. The described construction, which is intended more particularly for spindles of small electric motors of at most 15 mms. in diameter, involves difficulties, as has been found in practice. More particularly if a radial pressure is exerted upon the spindle such as is the case with small motors for driving turntables, in which between the motor spindle and the turntable use is made of an adjustable intermediate wheel, it occurs that as a result of the radial pressure upon the spindle the ball performs a rotary and sliding movement on the surface 4. This is liable to occur with any radial load on the spindle. It may then happen that the dish-shaped member is likewise displaced and the spring is compressed additionally. Return of the spindle to the correct position then involves difficulties and the ball exerts a braking effect upon the spindle, since the ball rarely returns with the opening exactly concentric with the spindle. Thus, the very fact that such motors have small power results in a reduction of speed with the known unpleasant consequences. A slight shock may occur which suffices to give the spindle with the ball 1 a more or less inclined position and, during its return, the spindle is then braked in the above-described manner. Furthermore, the dish-shaped member assumes an inclined position as a result of the compression of the spring, so that the chance of a braking action of the ball as a result of a wrong position increases, since the member does not return to its initial position.

According to the invention, the aforesaid disadvantages are suppressed in that the surface of the casing remote from the ball, which is engaged by the resilient element, has an abutment limiting the movement of the dish-shaped member in the axial direction, the resilient element being such that it has a constant displacing force and does not exert any radial directional force upon the dish-shaped member. According to the invention, in the first place, the movement of the dish-shaped member is thus limited, so that it can perform only a small movement in the axial direction. As a result thereof, the resilient element can be compressed but slightly and cannot be overloaded and certainly cannot exert asymmetrically a comparatively strong pressure upon the dish. Furthermore, the resilient element is required to have a substantially constant displacing force in the region in which compression can take place, so that the pressure upon the dish is constant, and finally it is not allowed to exert any radial directional force upon the dish-shaped member, so that displacement thereof owing to such a force in a radial direction is also excluded. It will be evident that within narrow limits the displacement of the dish-shaped member takes place parallel to itself, and in so far a slight torsion still occurs, it is corrected in the engaged position.

It will be evident that the abutment may be formed from the portion of the casing which is engaged by the resilient element. In one embodiment of the invention, the surface of the resilient element which engages the abutment is formed, however, by a separate dish-shaped member, so that the casing proper may remain substantially closed.

The resilient element to be used in accordance with the invention may have different forms. In another embodiment of the invention, it is preferably an undulated spring. An undulated spring has no tendency to bend and in the compressed condition does not produce any asymmetrical load, so that a radial force is not exerted upon the dish-shaped member and the latter does not encounter in any radial direction a resistance which differs from the resistance in other radial directions, in other words, the member can slide in any direction over the spring in the compressed condition without showing any preferential direction.

In order that the invention may be readily carried into effect, one embodiment will now be described more fully, by way of example, with reference to the accompanying drawing, in which:

Fig. 1 is a sectional view of a bearing having a self-adjusting spherical member.

Figure 2:
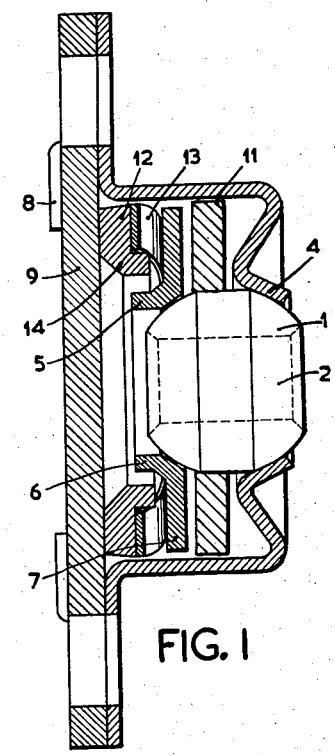
Fig. 2 is a side-view of an undulated spring.
Figure 3:
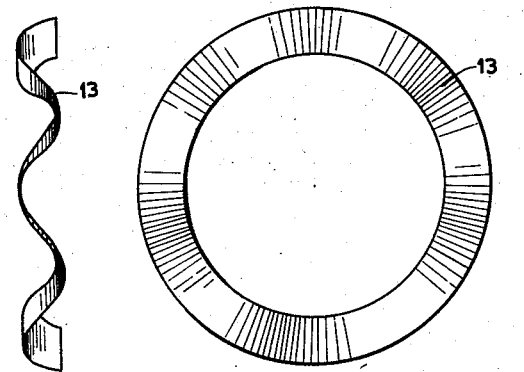
Fig. 3 is an elevation view of the undulated spring of Fig. 2.

In Fig. 1 the reference numeral 1 indicates a spherical body which usually consists of porous self-lubricating material and which has an aperture 2 into which fits the shaft to be journalled. This ball is supported, on the one hand, by a casing 3, of which the portion 4, which is part of a conical surface or part of a spherical surface, engages the ball, while the ball is supported, on the other hand, by a dish-shaped member 5 which is composed of a portion 6, which is likewise part of a conical surface or a spherical surface, and a dish 7. The casing 3 is connected by means of tags 8 to a covering plate 9. A second dish-shaped member 12 is placed between the dish-shaped member 5 and the covering plate 9. Between the second member 12 and the dish-shaped member 5 there is provided an undulated spring 13, while the member 12 has a collar 14 which constitutes an abutment for the member 5. When the spring 13 is compressed only slightly, a small space exists between the upper face of the abutment 14 and the dish 7. In the first place, it will be evident that the dish 7 can perform only a small movement in the direction of the dish 14. During this small movement, the undulated spring 13 is compressed further, but this compression does not result in any radial force being exerted upon the dish-shaped member 5. On the contrary, the latter may slide freely in any direction over the spring 13, so that the ball is not retained in the inclined position nor slid back into this position and the spindle cannot clamp or brake. Since the undulated spring has no directional effect in a special axial direction, the dish has perfect freedom of movement and thus naturally returns in the direction imposed upon the dish-shaped member 5 by the ball.

As soon as the radial load exceeds a certain limit such that the ball displaces itself over the conical surface 4, the undulated spring is compressed. This compression results in radial expansion of the undulated spring, whereby any contact point radially slides away both over dish 7 and over dish 12. Consequently, a radial force is not exerted upon the dish 7 and the latter can move without any force being required therefor. Even after the radial force upon the spindle has disappeared or has been suppressed and the spindle returns to its initial position, the dish returns to the correct position substantially without friction, thus avoiding damping or braking of the spindle as a result of an inclined position of the ball.

The separate dish-shaped member 14 may alternatively be replaced by a protuberance of the closure plate 9, but in this case there is a greater risk of contamination of the bearing as a result of penetrating dust.

It should be noted that an oil-impregnated felt ring 11 surrounds the spherical body 1 providing lubrication for the latter.

In conclusion, it is also possible to utilize, instead of an undulated spring, for example a rubber spring which is constituted by a closed ring. However, in this case, it is necessary to ensure that oil cannot come into contact with the rubber spring and that the temperature remains sufficiently low. The resistance against sliding for rubber is also different from that for an undulated spring.

What is claimed is:

1. A bearing structure comprising a casing, a spherical body in said casing having an opening therethrough for receiving a spindle, a member rigidly secured to said casing and supporting said spherical body on one side thereof, a first dish-shaped element movable in any direction in said casing and supporting the other side of said spherical body, the supporting surface of said dish-shaped element being part of a conical surface, a second dish-shaped element, a resilient element positioned between said first and second dish-shaped elements which exerts an axial force relative to said spindle, said surface of said second dish-shaped element which is engaged by said resilient element being provided with an abutment for limiting the movement of said first dish-shaped element in an axial direction, said resilient element having a substantially constant displacing force which does not exert any radial directional force upon said first dish-shaped element.

2. A bearing structure as claimed in claim 1 wherein said resilient element is an undulated spring.

References Cited in the file of this patent

UNITED STATES PATENTS

| | | |
|---|---|---|
| 1,722,478 | Nelson | July 30, 1929 |
| 2,009,124 | Skolfield | July 23, 1935 |
| 2,668,086 | Marzolf | Feb. 2, 1954 |